United States Patent [19]

Lockwood

[11] Patent Number: 4,936,396
[45] Date of Patent: Jun. 26, 1990

[54] FASTENER ARRANGEMENT FOR ELECTRICAL JUNCTION BOX OR THE LIKE

[75] Inventor: Alan C. Lockwood, Rosemead, Calif.

[73] Assignee: Masco Building Products Corp., Taylor, Mich.

[21] Appl. No.: 308,688

[22] Filed: Feb. 8, 1989

[51] Int. Cl.⁵ .......................................... H02G 3/08
[52] U.S. Cl. ...................................................... 174/53
[58] Field of Search ............................ 174/53; 220/3.2

[56] References Cited

U.S. PATENT DOCUMENTS

| 2,149,719 | 3/1939 | Arnest | 220/3.4 |
| 2,528,675 | 11/1950 | Tinnerman | 403/343 |
| 2,571,747 | 10/1951 | Murphy | 411/107 |
| 2,867,349 | 1/1959 | Parker, Jr. | 220/3.3 |
| 3,375,749 | 4/1968 | Coldren et al. | 411/15 |
| 3,526,703 | 9/1970 | Tucker | 174/53 |
| 3,876,821 | 4/1975 | Pringle | 174/53 |
| 3,955,463 | 5/1976 | Hoehn | 411/548 |
| 4,105,862 | 8/1978 | Hoehn | 174/53 |
| 4,167,648 | 9/1979 | Lockwood | 174/53 |
| 4,188,854 | 2/1980 | Hoehn | 411/437 |

FOREIGN PATENT DOCUMENTS 1526797 12/1964 France .
1514108 5/1966 France .
1190378 7/1967 United Kingdom .

Primary Examiner—Leo P. Picard
Assistant Examiner—David A. Tone
Attorney, Agent, or Firm—Poms, Smith, Lande & Rose

[57] ABSTRACT

A molded junction box is shown having four sidewalls, a closed bottom, an open top, and clip receiving columns on two opposing sidewalls. The clip receiving columns each have an aperture therein with four sidewalls and four sloping surfaces that join the four sidewalls to a clip receiving surface at the open top of the junction box. A U-shaped clip is received within the aperture whose sloping surfaces aid assembly and provide a guide for the fastener insertion.

18 Claims, 2 Drawing Sheets

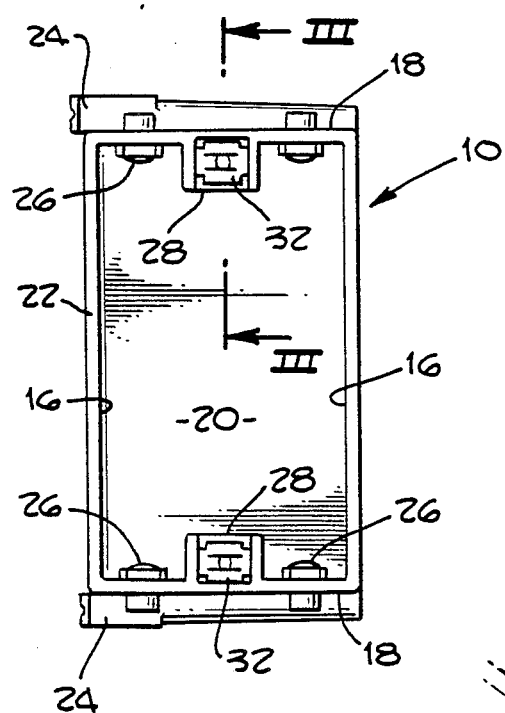
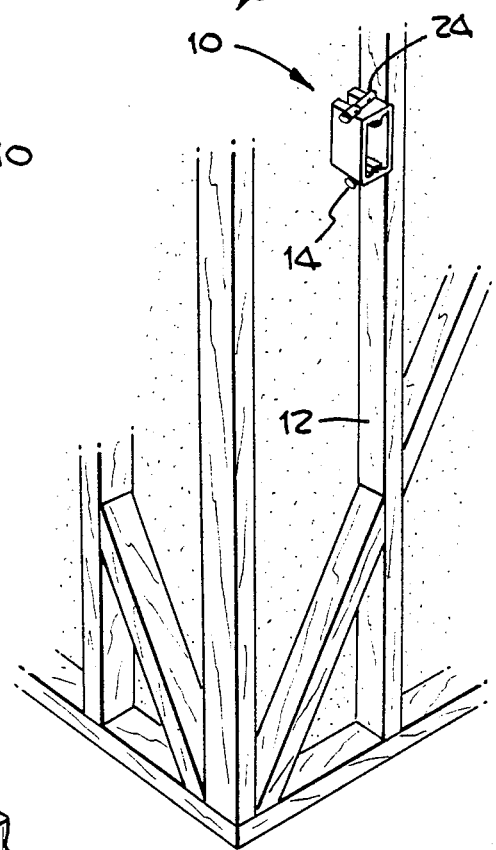
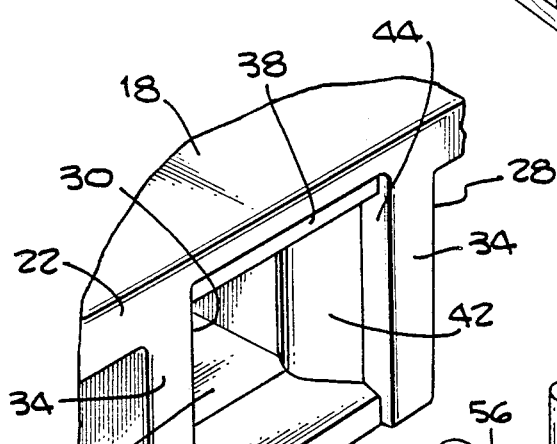
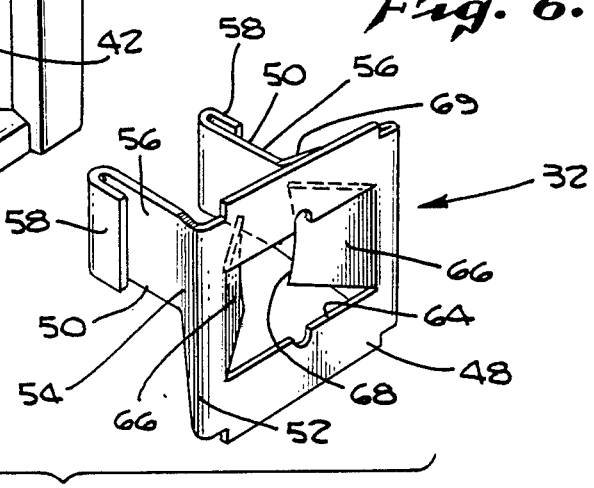

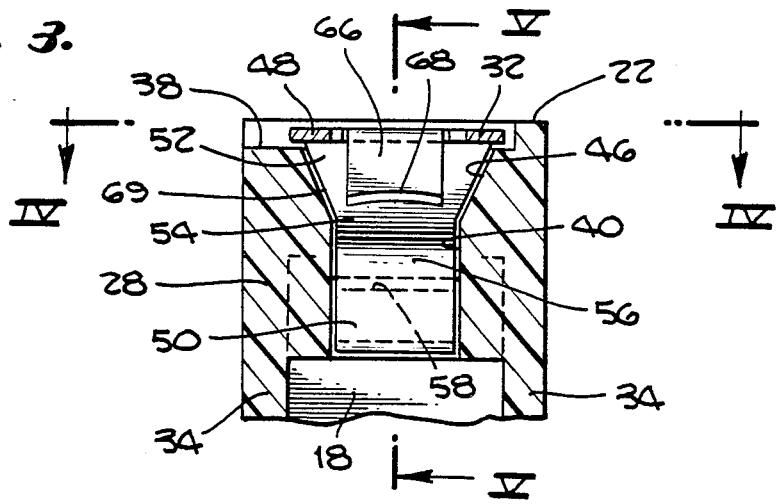
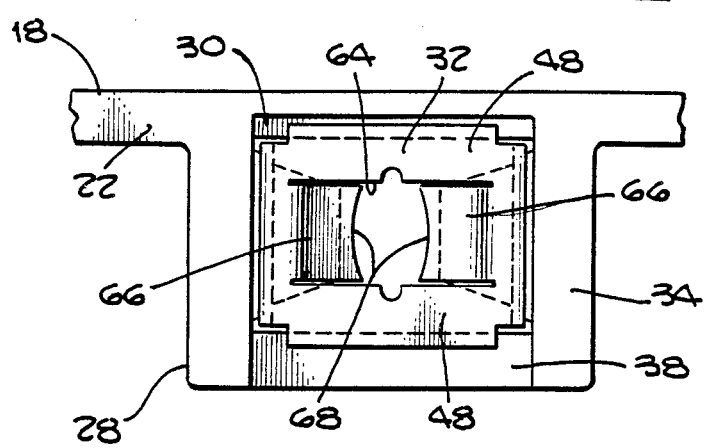
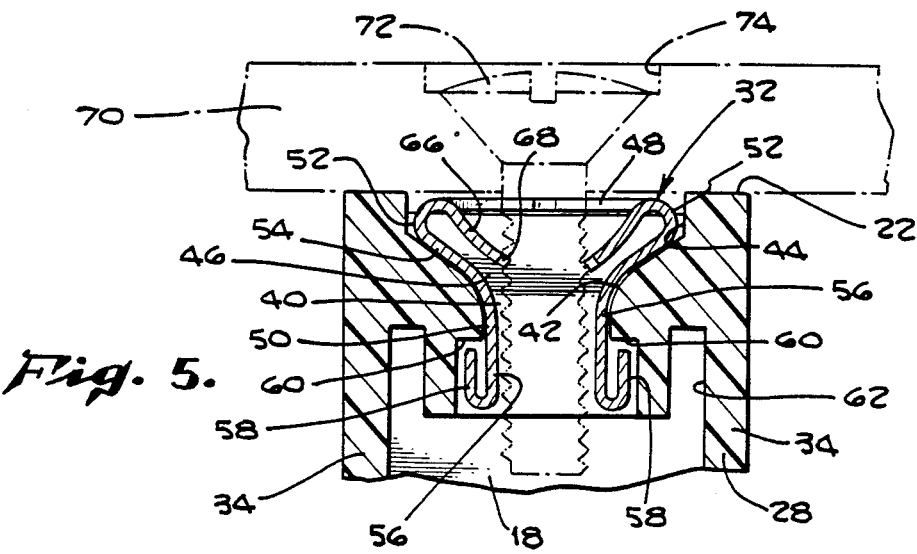

FASTENER ARRANGEMENT FOR ELECTRICAL JUNCTION BOX OR THE LIKE

BACKGROUND OF THE INVENTION

1. Field of the Invention

The present invention relates to an improved fastener arrangement for an electrical junction box and, more particularly, to a molded electrical junction box having an improved clip receiving aperture for guiding a clip into the aperture during assembly. The clip is thus used to retain a fastener, such as a screw, that mounts a wall switch or plug.

2. Description of the Prior Art

Electrical junction boxes which enclose and protect the wiring to electrical wall switches and plugs have been used for many years and are required by most, if not all, building and electrical codes. Over the years, many designs have been proposed to improve electrical junction boxes by, for example, devices which permit quick assembly of an electrical switch or plug into the junction box. One such arrangement is shown in U.S. Pat. No. 2,149,719, which issued Mar. 7, 1939, by H. L. Arnest. This device shows a junction box having a screw receiving sleeve and a cylindrical insert therein with spring fingers extending from the cylinder. The spring fingers are tapered to permit the rapid thrust insertion of a screw. The fingers then contract upon the screw to retain it within the sleeve and thereby quickly mount the wall switch or plug. The junction box shown in the Arnest patent is constructed from fabricated metal.

A later development in junction box technology included the use of molds to form a molded junction box. Such a box is shown in U.S. Pat. No. 2,867,349, which issued Jan. 16, 1959, by W. M. Parker, Jr. The junction box taught by this patent is formed from a mold which places molded screw holes at appropriate places in the junction box for receiving and mounting a switch or plug. This device does not account for a quick thrust insertion of a fastening screw by pushing the screw into the threaded hole, as in the Arnest patent.

In U.S. Pat. No. 4,167,648, issued Sept. 11, 1979, by A. C. Lockwood, there is disclosed a molded junction box having molded sidewalls, a closed bottom and open top. The short walls of the four-sided junction box include columns which terminate at the opened top of the junction box and into which are molded specially designed and complex apertures for receiving specially designed clips. The clips accommodate a thrusting insertion of the fastening screws.

Other forms of molded junction boxes have been designed with various apertures molded into the clip receiving columns and various clips for insertion therein. Most of these prior art arrangements disclose an electrical junction box with clip receiving columns having apertures therein that are complex in shape. The complexity of these apertures requires a more complex mold which is difficult to maintain. Further, the process of assembling a clip into an electrical junction box and its complexed aperture is more difficult.

SUMMARY OF THE INVENTION

Accordingly, an object of the present invention is to provide an electrical junction box with a simplified clip receiving aperture therein that requires molding tools which are easy to maintain.

A further object of the present invention provides a molded aperture that receives a clip for easy assembly and provides a visual indication that the clip is properly seated.

A still further object of the present invention is to provide a clip and a molded aperture which, when the clip is assembled into the aperture, permits easy insertion of a fastener, such as a screw.

Another object of the invention provides for a clip and clip receiving aperture that permits the insertion of a fastener, such as a screw, to properly seat the clip within the aperture if the clip is not previously seated.

Yet another object of the invention provides a clip that, once having received a fastener, such as a screw, is positively locked within the clip receiving aperture.

In accomplishing these and other objects, there is provided a molded electrical junction box having four sidewalls, a closed bottom and an opened top. Molded along the two shorter walls of the junction box are two clip receiving columns. The clip receiving columns terminate near the opened top of the junction box at a clip receiving surface having an aperture therein. The clip receiving aperture has four sidewalls which merge through four sloping surfaces to substantially join the four sidewalls of the clip receiving surface. A generally U-shaped clip having a flat upper surface and descending legs is inserted into the clip receiving aperture and locked therein for positively locking the clip into the aperture.

DESCRIPTION OF THE DRAWINGS

Other objects and advantages of the present invention will become apparent to the reader after careful consideration of the following specification and accompanying drawings, wherein FIG. 1 is a perspective view showing a molded electrical junction box incorporating the improved fastener arrangement of the present invention;

FIG. 2 is a top view of the electrical junction box of FIG. 1;

FIG. 3 is a partial, cross-sectional view taken along line III—III of FIG. 2 showing the clip receiving aperture and clip of the present invention:

FIG. 4 is a partial, top view taken along line IV—IV of FIG. 3;

FIG. 5 is a partial, cross-sectional view taken along line V—V of FIG. 3; and

FIG. 6 is a partial, exploded view showing the clip receiving aperture and clip of the present invention.

DESCRIPTION OF THE PREFERRED EMBODIMENT

Referring now to the drawings, FIG. 1 shows a typical molded, electrical junction box 10 that may be used in housing construction to mount electrical devices, such as wall switches or plugs, not shown. The junction box 10 is used to protect the electrical wiring at the point of termination where each wire is attached to the electrical wall switch, for example. The junction box 10 mounts against a two-by-four 12 where it is retained by a pair of nails 14, for example. Alternately, the junction box 10 may be mounted upon other suitable supports within various wall structures.

In FIG. 2, it will be seen that a typical junction box 10 includes four sidewalls, 16 and 18, with two sidewalls 18 generally shorter than the other two sidewalls 16, a closed bottom wall 20, and an open top 22. The two shorter opposing sidewalls 18 are provided with molded, nail receiving sleeves 24 and knockouts 26, as is known in the art. On the inner surface of each shorter sidewall 18 is a molded, clip receiving column 28 which extends from the closed bottom wall 20 to the open top 22 of the molded junction box 10. In the preferred embodiment, the clip receiving columns 28 are generally U-shaped with the bottom of the U extending into the opening of the junction box 10 and the legs of the U molded into the shorter walls 18. In the preferred embodiment, the wall 18 is open below the nail receiving sleeves 24, not shown, to simplify the molds that form junction box 10 and save plastic material.

The upper surfaces of the clip receiving columns 28 are provided with clip receiving apertures 30 that each receive a fastener retaining clip 32. It will be seen in FIG. 6 that the U-shaped clip receiving column 28 includes two side segments 34 which extend to the open top 22 of the junction box 10. Between side segments 34 is a base segment 36 which completes the U-shaped column 28. Note that the base segment 36 and a portion of sidewall 18 are recessed at the open top 22 to establish a clip receiving surface 38. Below the clip receiving surface 38 is a four sided aperture 40 having two of its four sides joined to the side segments 34 by a curved surface 42 which nearly curves to the open top 22 of wall segment 34 but, in the preferred embodiment, which has a short vertical section 44 just before reaching the open top 22 of side segment 34. The curved wall 42 and vertical section 44 are best seen in FIG. 5. The second two walls of the four sided aperture 40 are joined to the clip receiving surface 38 in base segment 36 and sidewall 18 by flat, tapered surfaces 46 which are best seen in FIG. 3.

The single opening that forms the clip receiving aperture 30 thus includes the four sided aperture 40 substantially joined by the sloping surfaces 42 and 46 to the clip receiving surface 38. These sloping surfaces 42 and 46 of the aperture 30 provide a simple aperture configuration for improved assembly of the clip 32 therein. Further, the single, simple, sloping aperture 30 may be manufactured from a mold that is less detailed and is easier to maintain.

The clip 32 is generally U-shaped with a flat top portion 48 which forms the top of the U. Each side of the U is formed by descending legs 50 best seen in FIG. 5 which descend in an inwardly curved section 52 and are then outwardly offset through a second curved section 54 which joins a vertical section 56. At the bottom of each vertical section 56 that forms each leg of the U-shaped clip 32 is a 180° outward bend that forms an upwardly extending stop or latch 58 on each leg.

As best seen in FIG. 5, the latch 58 on each leg 50 of clip 32 fits under a clip latching surface or shoulder 60 formed just beneath each of the curved surfaces 42 of the four sided aperture 40. Note that the inside of the U-shaped clip receiving column 28 may be relieved at 62 between shoulder 60 and side segment 34 to reduce the mass of the molding material which forms junction box 10 and to establish a generally uniform cross-sectional thickness of the molded material.

Referring now to FIGS. 4 and 6, the flat, top portion 48 of clip 32 is shown with a fastener receiving aperture 64 which is formed by a generally H-shaped cut to establish two descending tabs 66 having slightly curved ends 68. The tabs 66 curved downwardly and slightly inwardly and are arranged in a generally parallel configuration with the curved sections 54 of descending clip legs 50.

The clip 32 is assembled into the single, simple, sloping aperture 30 by automated equipment. The curved sections 54 of the clip legs 50 form the generally U-shaped clip 32 with a smaller width between the lower vertical sections 56 than between the upper curved sections 52, as seen in FIG. 5. Further, it will be seen in FIG. 3 that each leg 50 is provided with inwardly tapering edges 69 as the leg extends through the first and second curved sections, 52 and 54. The tapering edges function to form the clip 32 with a smaller width across each leg 50 than across the flat top portion 48. Thus, the lower portions of each clip 32 fit easily into the upper portion of aperture 30 as the clip is inserted therein. The smaller widths across and between the legs 50 interact with the sloping surfaces formed by curved surfaces 42 and tapered surfaces 46 of aperture 30 to guide the clip 32 into its intended position. Once the clip 32 is positioned, curved surfaces 42 fit snugly with the second curved sections 54 of the clip legs 50, while tapered surfaces 46 fit snugly with the tapered edges 69 of the clip legs. This arrangement simplifies the assembly equipment required for placing clips 32 into aperture 30 of the junction box 10.

Another feature of the clip 32 is that the width across each leg 50 is greater than the width of the aperture 64 formed by the H-shaped cut. This prevents the legs 50 of one clip from nesting into the aperture 64 of another clip when a plurality of the clips 32 are dumped into a vibrating tray of an automatic assembly machine, for example. This arrangement further simplifies the assembly equipment.

In operation, an electrical wall switch or plug 70, shown in phantom in FIG. 5, is connected to the junction box 10 by a pair of screws 72, only one of which is shown in phantom in FIG. 5. As is known, the assembly of the wall switch or plug 70 into junction box 10 is accomplished by inserting screws 72 through the aperture 74 in the switch 70 and then thrusting each screw 72 past the descending tabs 66. The curved ends 68 of tabs 66 tend to center the screw 72 and grip the threads therein as the threads detent past the tab ends 68. It will be noted that the curved sections 54 of clip legs 50 act as stops to prevent the tabs 66 from being over stressed during the insertion of a fastener, such as screws 72. Once screws 72 have been inserted into the fastener receiving aperture 64 of clip 32 between tabs 66, the screw may be removed by turning, generally in the counterclockwise direction, and reinserted either by turning, generally in the clockwise direction, or by pushing the screw past the tabs as described above.

The advantage of the clip 32 shown in FIGS. 3-6 is that the descending tabs 66 positively grip the screw 72 or other fastener from either side to lock the screw within clip aperture 64 and molded junction box aperture 30. The shoulders 60 within the molded junction box also interact with the latches 58 on clip legs 50 to positively lock the clip 32 within the junction box 10. Because of the location of descending tabs 66, a relatively short screw or other fastener may be used to connect the switch 70 into junction box 10. If a carpenter or electrician were to mount the junction box 10 incorrectly against the two-by-four 12, thus requiring a longer screw, a standard screw supplied with the wall switch 70 would be long enough to be engaged and positively locked by the descending clip tabs 66 of the present invention.

Should the clip 32 not be seated and locked within the clip receiving aperture 30, the clip 32 in this invention will clearly indicate upon inspection that it is not properly seated. If such an inspection missed the improper seating of the clip 32 into the aperture 30, the force of inserting a screw 72 or other fastener into the fastener receiving aperture 64 in clip 32 will properly position the clip 32 within the clip receiving aperture 30 and positively lock that clip therein for positively locking the screw within the clip.

It will be seen from the drawings that the clip 32 and clip receiving aperture 30 may be arranged so that the screw 72 or other fastener is supported from four sides once it is inserted into the aperture 30. That is, two sides of the metal clip formed by the vertical sections 56 will support the screw 72 from two sides; while two sides formed by the four sided aperture 40 will support the screw from two other sides normal to the first-mentioned sides. These sides help to guide the screw straight during insertion, which facilitates the insertion. As other modifications and variations of this invention are possible, the invention described herein should be limited only by the appended claims.

I claim:

1. In a molded electrical junction box having four sidewalls, a closed bottom, an open top, and molded, clip receiving columns on two opposing sidewalls, the improvement comprising:
    said clip receiving columns each having a clip receiving surface and a single opening therein with four sidewalls;
    said clip receiving columns each further having four sloping surfaces substantially joining said four sidewalls of said single opening to said clip receiving surface.

2. The molded electrical junction box of claim 1, wherein:
    said clip receiving surface on each clip receiving column includes two surfaces upon which to seat a clip and two surfaces raised to be flush with a seated clip.

3. The molded electrical junction box of claim 1, wherein:
    two of said four sloping surfaces are flat, tapered surfaces for guiding a clip into each of said clip receiving columns; and
    the remaining two of said four sloping surfaces are curved surfaces for guiding a clip into each of said clip receiving columns and for supporting a clip once seated therein.

4. The molded electrical junction box of claim 3, wherein:
    said remaining two of said four sloping surfaces that curve for guiding a clip into each column terminate in a clip latching shoulder.

5. The molded electrical junction box of claim 1, additionally comprising:
    a clip having a general U-shape with two descending legs for insertion into said single opening in each of said clip receiving columns.

6. The molded electrical junction box of claim 5, wherein:
    said two descending legs are inwardly offset to partially support a fastener from opposing directions.

7. The molded electrical junction box of claim 6, wherein:
    two of said four sidewalls that form said single opening partially support a fastener from opposing directions normal to said first-mentioned opposing directions.

8. The molded electrical junction box of claim 5, wherein:
    said U-shaped clip has a top portion with said two descending legs each extending downwardly therefrom and then inwardly through a curved section to a vertically descending, fastener engaging portion.

9. The molded electrical junction box of claim 8, wherein:
    said vertically descending portion of each leg of said U-shaped clip terminates at a vertically ascending portion; and
    two of the four sidewalls of said single opening have shoulders under which said vertically ascending portions of each leg snap for positively locking said clip into said opening.

10. The molded electrical junction box of claim 8, wherein:
    two of said four sloping surfaces substantially joining said four sidewalls of said single opening to said clip receiving surface are curved to match and support said curved portion of each leg of said U-shaped clip.

11. The molded electrical junction box of claim 7, additionally comprising:
    said top portion of said clip having a fastener receiving aperture therein formed by the separation of two descending tabs which are adapted to engage a fastener therebetween.

12. The molded electrical junction box of claim 11, wherein:
    said two descending tabs are generally parallel to said downwardly curved portions of said legs of said U-shaped clip, wherein said curved portions of said legs provide a stop for said descending tabs.

13. The molded electrical junction box of claim 7, wherein:
    said two descending legs of said clip each include said curved section to form the lower portion of said clip between said legs smaller than said top portion; and
    said two descending legs of said clip each include tapering edges along said curved section to form the lower portion of said clip across said legs smaller than said top portion.

14. The molded electrical junction box of claim 7, wherein:
    said two descending legs of said clip each include said curved section to form the lower portion of said clip between said legs smaller than said top portion;
    said two descending legs of said clip each include tapering edges along said curved section to form the lower portion of said clip across said legs smaller than said top portion;
    said curved sections of said legs of said clip fit snugly against said two curved surfaces of said four sloping surfaces within said single opening; and
    said tapered edges of said legs of said clip fit snugly against said two tapered surfaces of said four sloping surfaces within said single opening.

15. In a molded electrical junction box having four sidewalls, a closed bottom, an open top, and clip receiving columns on two opposing sidewalls, the improvement comprising:
    each column extending along said two opposing sidewalls to a clip receiving surface near said open top;
    said clip receiving columns each having a single opening therein with four sidewalls;

said clip receiving columns each having four sloping surfaces substantially joining said four sidewalls of said single opening to said clip receiving surface; and clips each having a general U-shape with a flat top portion that rests against said clip receiving surface and two descending legs for guided insertion of said clip by said four sloping surfaces of each of said clip receiving columns into said single opening in each of said clip receiving columns.

16. A clip for retaining a fastener, comprising:

a flat top surface having two descending legs on opposite sides thereof to form a generally U-shaped clip;

said legs extending downwardly from said top surface and then inwardly through a curved portion to a vertically descending portion;

said vertically descending portion bent outwardly and upwardly to form a latch portion; and said top surface having a fastener receiving aperture formed from the displacement of two tabs which extend downward and generally parallel to said curved portion of each leg to engage and retain said fastener.

17. A clip for retaining a fastener, as claimed in claim 16, wherein:

said fastener receiving aperture has a fixed width in a direction parallel to said descending legs; and said descending legs are wider than said fixed width of said aperture to prevent the nesting of a plurality of said clips.

18. A molded electrical junction box, comprising:

a generally U-shaped clip for retaining a fastener;

a molded housing having at least one single, four sided aperture therein for receipt of said clip;

said U-shaped clip having a flat top surface and two descending legs on opposite sides thereof;

at least one of said descending legs having a latch portion formed therein;

at least one of said four sides of said aperture having a shoulder under which said latch portion of said at least one clip leg snaps for positively locking said clip into said aperture;

said clip legs and two of said four aperture sides adopted to guide a fastener during insertion therein.

* * * * *